United States Patent
Pal et al.

(10) Patent No.: US 6,813,311 B1
(45) Date of Patent: Nov. 2, 2004

(54) NON-LINEAR ECHO CANCELLATION FOR WIRELESS MODEMS AND THE LIKE

(75) Inventors: Debajyoti Pal, Fremont, CA (US); Chung-Li Lu, Sunnyvale, CA (US); Sujai Chari, Redwood City, CA (US)

(73) Assignee: Globespan Virata Corporation, Santa Clara, CA (US)

(*) Notice: Subject to any disclaimer, the term of this patent is extended or adjusted under 35 U.S.C. 154(b) by 0 days.

(21) Appl. No.: 09/525,452

(22) Filed: Mar. 14, 2000

(51) Int. Cl.[7] .............. H04B 1/38; H04B 3/20; H04L 5/16; H04M 9/08
(52) U.S. Cl. ............ 375/219; 375/220; 370/286; 379/406.01; 379/406.08
(58) Field of Search ................ 375/219, 220, 375/222, 346, 350; 379/406.01, 406.05, 406.08, 406.06; 370/286, 284, 290, 291; 455/570

(56) References Cited

U.S. PATENT DOCUMENTS

| | | | |
|---|---|---|---|
| 3,647,992 A | 3/1972 | Thomas | 379/406.08 |
| 4,669,116 A | 5/1987 | Agazzi et al. | 379/406.08 |
| 4,746,902 A | 5/1988 | Tol et al. | 370/286 |
| 4,999,627 A | 3/1991 | Agazzi | 341/131 |
| 5,148,427 A | 9/1992 | Buttle et al. | 370/291 |
| 5,189,637 A | 2/1993 | Eriksson | 370/286 |
| 6,687,235 B1 * | 2/2004 | Chu | 370/286 |

FOREIGN PATENT DOCUMENTS

JP 5-41681 * 2/1993

* cited by examiner

Primary Examiner—Betsy L. Deppe
(74) Attorney, Agent, or Firm—Burns, Doane, Swecker and Mathis, LLP

(57) ABSTRACT

The present invention, generally speaking, provides for cancellation of non-linear distortions within the echo path of a communications system by characterizing the nonlinearity, performing digital processing of a data signal to cause substantially the same nonlinearity to be applied to the data signal, and inputting a resulting data signal to a non-linear echo-cancellation path. In an exemplary embodiment, the non-linear echo-cancellation path includes as a nonlinear echo canceller a transversal filter or the like. A separate linear echo cancellation path is also provided. Training of the nonlinear echo canceller follows training of the linear echo canceller. This technique is particularly applicable to cancelling the effects of DAC nonlinearity, which can be readily characterized. Using this technique, cancellation improvement of about 3dB can readily be obtained. Alternatively, instead of achieving a lower residual echo floor, the linearity requirements for the transmit DAC can be relaxed. A lower number of bits of precision allows for lower DAC power consumption. The technique is particularly applicable to DSL applications.

14 Claims, 5 Drawing Sheets

NON-LINEAR ECHO CANCELLATION FOR WIRELESS MODEMS AND THE LIKE

BACKGROUND OF THE INVENTION

1. Field of the Invention

The present invention relates to wireline communications and more particularly to echo cancellation.

2. State of the Art

In wireline communications, echo cancellation is used to remove from a received signal a portion of the signal attributable to reflection of a transmitted signal. The bulk of an echo signal can be cancelled using linear techniques. Linear echo cancellation, however, may still leave substantial residual echo attributable to non-linear distortions within the communications channel. One significant source of non-linear distortion is a transmit digital-to-analog converter (DAC). DAC linearity is specified in terms of bits. For example, a 16-bit DAC may have only 15-bit linearity.

Various approaches to non-linear echo cancellation have been attempted with varying degrees of success. U.S. Pat. No. 5,148,427, for example, describes an arrangement using a fast transversal-filter-based linear echo canceller and a slow, lookup-table (LUT)-based non-linear echo canceller. The LUT is shown as consisting of five 16-word RAMs, for a total of 80 words of storage. For a particular sequence of data symbols, data words from respective locations within each RAM are summed together to form an estimate of a non-linear echo contribution for that data sequence.

U.S. Pat. No. 4,669,116 describes a quite different arrangement in which a conventional transversal-filter-based echo canceller is adapted to cancel both linear and non-linear distortion by determining selected taps corresponding to prominent coefficients of the nonlinearity and adopting for those taps a non-linear structure to which a suitably calculated tap weight is applied.

Nevertheless, there remains a need for a technique of non-linear echo cancellation that is both simple and effective.

SUMMARY OF THE INVENTION

The present invention, generally speaking, provides for cancellation of non-linear distortions within the echo path of a communications system by characterizing the non-linearity, performing digital processing of a data signal to cause substantially the same nonlinearity to be applied to the data signal, and inputting a resulting data signal to a non-linear echo-cancellation path. In an exemplary embodiment, the non-linear echo-cancellation path includes as a nonlinear echo canceller a transversal filter or the like. A separate linear echo cancellation path is also provided. Training of the nonlinear echo canceller follows training of the linear echo canceller. This technique is particularly applicable to cancelling the effects of DAC nonlinearity, which can be readily characterized. Using this technique, cancellation improvement of about 3dB can readily be obtained. Alternatively, instead of achieving a lower residual echo floor, the linearity requirements for the transmit DAC can be relaxed. A lower number of bits of precision allows for lower DAC power consumption. The technique is particularly applicable to DSL applications.

BRIEF DESCRIPTION OF THE DRAWING

The present invention may be further, understood from the following description in conjunction with the appended drawing. In the drawing.

DETAILED DESCRIPTION OF THE PREFERRED EMBODIMENTS

Figure 1:
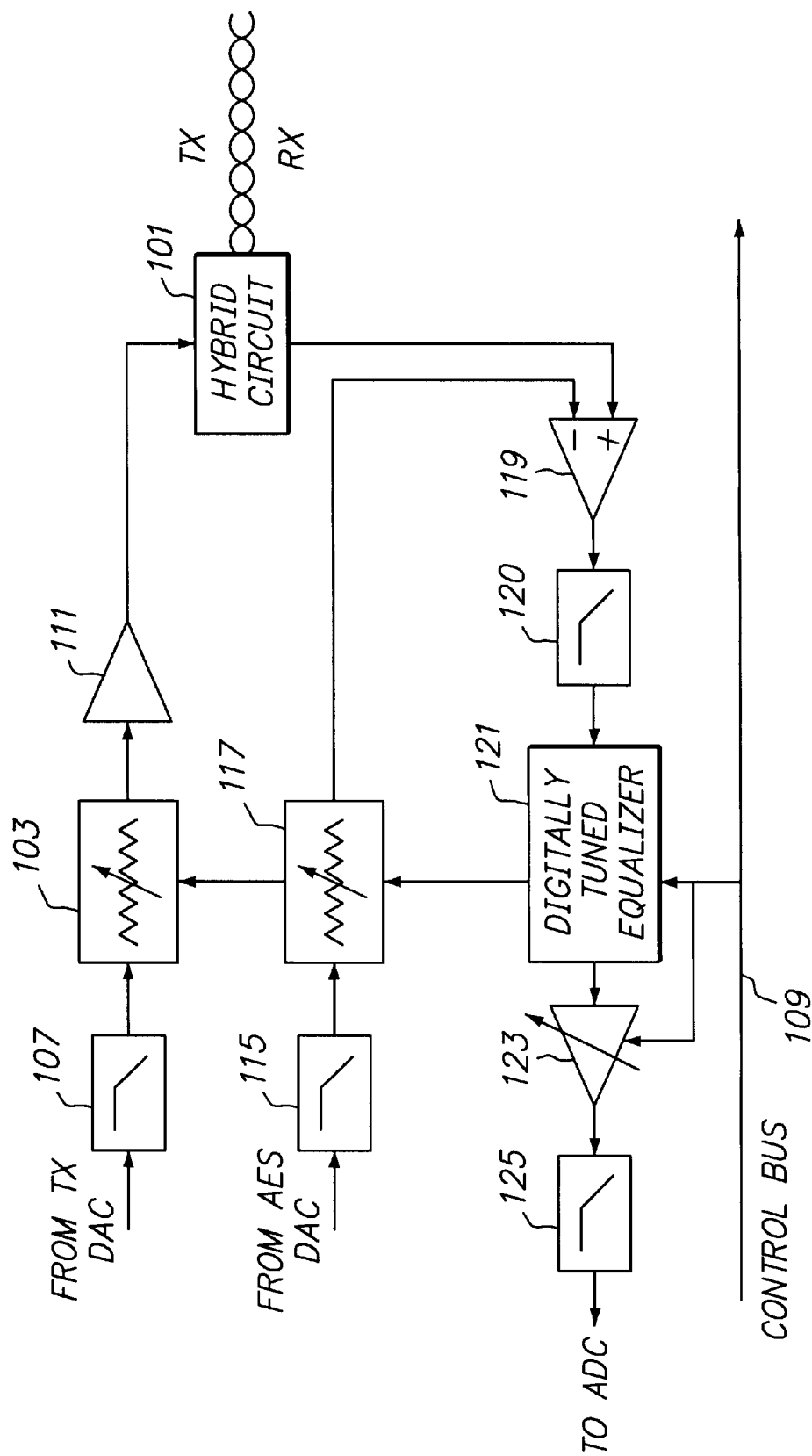
FIG. 1 is a block diagram of a first portion of a communications transceiver in which the present invention may be used.

Referring now to FIG. 1, a block diagram is shown of a first portion of an "analog front end," or AFE, of a communications transceiver in which the present invention may be used. The AFE may be divided into a transmit side and a receive side. A hybrid 101 is shared between the transmit side and the receive side. The transmit side may in turn be divided into a transmit signal path and an analog echo synthesis path.

The transmit signal path differs from the conventional transmit signal path of an AFE in that a digitally controlled attenuator 103 is used to realize a power cutback feature. More particularly, an output signal of the transmit DAC is filtered using a transmit filter 107. The transmit filter ensures that signal energy is confined to the transmission band. An output signal of the transmit filter is then selectively attenuated by the digitally controlled attenuator 103. Alternatively, the order of the transmit filter and the digitally controlled attenuator may be reversed; i.e., the digitally controlled attenuator may precede the transmit filter without affecting operation of the present invention. A suitable attenuation setting for the digitally controlled attenuator is selected by a control processor or digital signal processing engine (DSPE, not shown) and applied via a control bus 109. An output signal of the digitally controlled attenuator is then applied to a power amplifier and line driver 111, which drives the communications line through the hybrid 101.

The digitally controlled attenuator may be realized as an analog potentiometer having a digital control setting. Based on computed signal levels, the DSPE determines the appropriate scale factor for the transmit path. This setting is then communicated digitally through the control bus to the attenuator. Very fine tuning may therefore be achieved.

Digitally controlled power cutback is also invoked via the digitally controlled attenuator in the transmit path.

The analog echo synthesis (AES) path is composed of similar blocks as the transmit path. In particular, an output signal of the AES DAC is filtered using an AES filter 115. An output signal of the transmit filter is then selectively attenuated by a digitally controlled attenuator 117. Again, the order of the transmit filter and the digitally controlled attenuator may be reversed; i.e., the digitally controlled attenuator may precede the AES filter without affecting operation of the present invention. A suitable attenuation setting is selected by the control processor and applied via the control bus. An output signal of the digitally controlled attenuator is then applied to a summing amplifier 119 connected to the hybrid on the receive side.

In general, the attenuation setting of the digitally controlled attenuator in the AES path will be different than in the transmit path. More particularly, the digitally controlled attenuator in the AES path compensates for both the rejection level through the hybrid and the attenuation of the transmit attenuator for power cutback.

Figure 2:
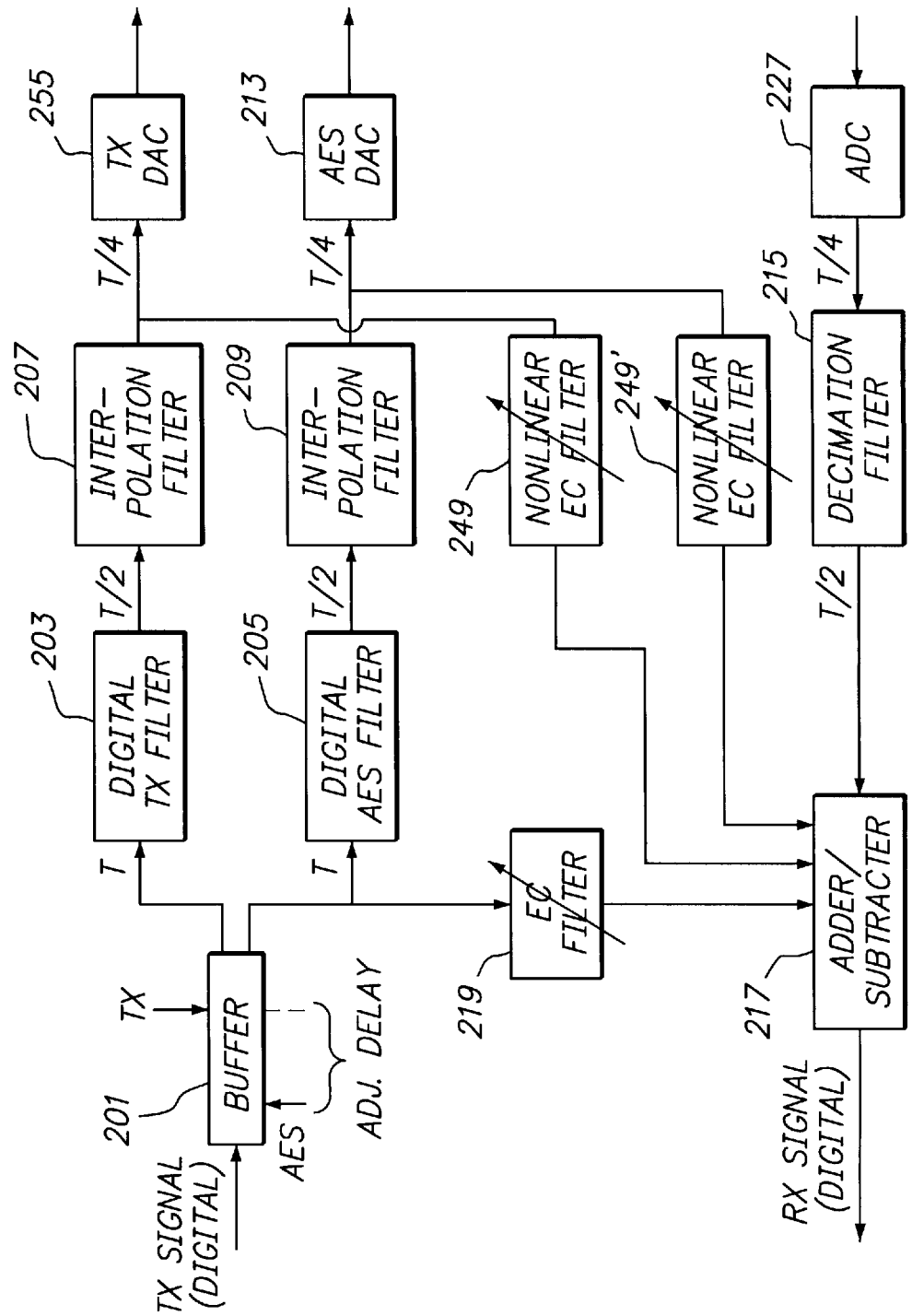
FIG. 2 is a block diagram of a remaining portion of the communications transceiver of FIG. 1.

The manner in which the digital echo signal is produced may be appreciated with reference to FIG. 2, showing a digital circuit that interfaces with the AFE, including a mechanism for feeding digital data to the transmit DAC and the AES DAC. A digital transmit signal is read out of a buffer 201 and applied to a digital transmit filter 203. The sample time of the digital transmit signal may be represented as T. A delayed replica of the same digital transmit signal is also applied to an adaptive digital AES filter 205. Separate Tx and AES pointers point to the current location in the buffer to be read out and applied to the digital transmit filter and to the adaptive digital AES filter, respectively. The effect of such an arrangement is the same as if the same digital transmit signal were applied to the digital transmit filter and also through an adjustable delay to the adaptive digital AES filter. The characteristics of the adaptive digital AES filter are set by the control processor through an adaptation algorithm that is run during initial training or at intervals, as desired.

The digital transmit filter and the adaptive AES filter are both interpolating filters that reduce the sample time to T/2 (i.e., double the sample rate). In an exemplary embodiment, these filters are followed by respective interpolation filter stages 207 and 209 that further reduce the sample time to T/4. The sample rate is therefore 4x the original sample rate. Output signals of the interpolation filter stages are applied to the transmit DAC 255 and the AES DAC 213, respectively.

The adaptive digital AES filter is trained during initialization to minimize a suitable measure of error such as mean-square error (MSE).

Note that the overall echo characteristic is simulated by two separate filters, an adaptive digital AES filter and an analog AES filter, operating in concert, and that an independent AES DAC is provided instead of using the transmit DAC. (In an exemplary embodiment, the analog AES filter and the analog transmit filter are both low-pass filters and have substantially the same characteristic.) Using an adaptive digital AES filter and an analog AES filter operating in concert enables a wide range of echo characteristics to be more easily simulated. More particularly, if the AES path were to share the transmit DAC, the AES filter would be required to simulate the echo response quite accurately, which would involve designing a very complicated analog filter. In accordance with the illustrated embodiment, the AES filter can be kept simple by placing an adaptive digital filter in front of the AES DAC.

Referring again to FIG. 1, on the receive side, the hybrid produces a receive signal that is applied to the summing amplifier, along with the AES signal. The summing amplifier subtracts the AES signal form the receive signal, thereby accomplishing echo attenuation or cancellation, and applies the resulting echo-cancelled signal to an optional pre-anti-aliasing filter 120. An output signal of the anti-aliasing filter is applied to a digitally-tunable equalizer stage 121 controlled through the control bus. An output signal of the digitally-tunable equalizer stage is applied to a digitally-tunable variable gain amplifier 123. In contrast to a conventional AGC circuit that operates automatically to raise the receive signal to a predetermined level for processing by a receive analog-to-digital converter (ADC), the stage is digitally controlled. It therefore functions as a digitally-tunable AGC (DT-AGC). An output signal OF the DT-AGC is input through a conventional anti-aliasing filter 125 to the receive ADC 227 (FIG. 2).

Instead of a regular analog AGC, the foregoing architecture uses the DSPE to digitally compute with greater accuracy the required gain setting, which information is then sent to the DT-AGC via the control bus.

Referring again to FIG. 2, the digital circuitry used to interface to the receive path of the AFE will now be described. A digital output signal of the ADC is sample-rate converted by a decimation filter 215. Whereas an input signal of the decimation filter has a sample time of T/4, an output signal of the decimation signal has a sample time of T/2. This signal is applied to an adder/subtracter 217. An adaptive digital echo canceller 219 is used to cancel residual echo not cancelled by the AFE. The digital transmit signal is applied to the adaptive digital echo canceller, which produces a residual echo signal. The adder/subtracter subtracts this signal from the output signal of the decimation filter.

In addition, an adaptive nonlinear echo canceller 249 is provided. The nonlinear echo canceller receives as its input signal the data stream applied to the transmit DAC 255. An output signal of the nonlinear echo canceller is applied to the adder/subtracter, which also subtracts this signal from the output signal of the decimation filter. Note that, whereas the linear echo canceller 219 receives its input signal in advance of the digital transmit filter 203 and hence includes the digital transmit filter 203 and the interpolation filter 207 within the cancellation path, the nonlinear echo canceller, which is principally intended to cancel nonlinearities caused by the transmit DAC 255, receives its input signal (in the illustrated embodiment) directly in advance of the transmit DAC 255. The nonlinear echo canceller is principally intended to cancel nonlinearity caused by the transmit DAC 255 because such nonlinearity is relatively fixed and easy to characterize. Other sources of nonlinearity within the channel are either not fixed or not readily characterizable.

Figure 3:
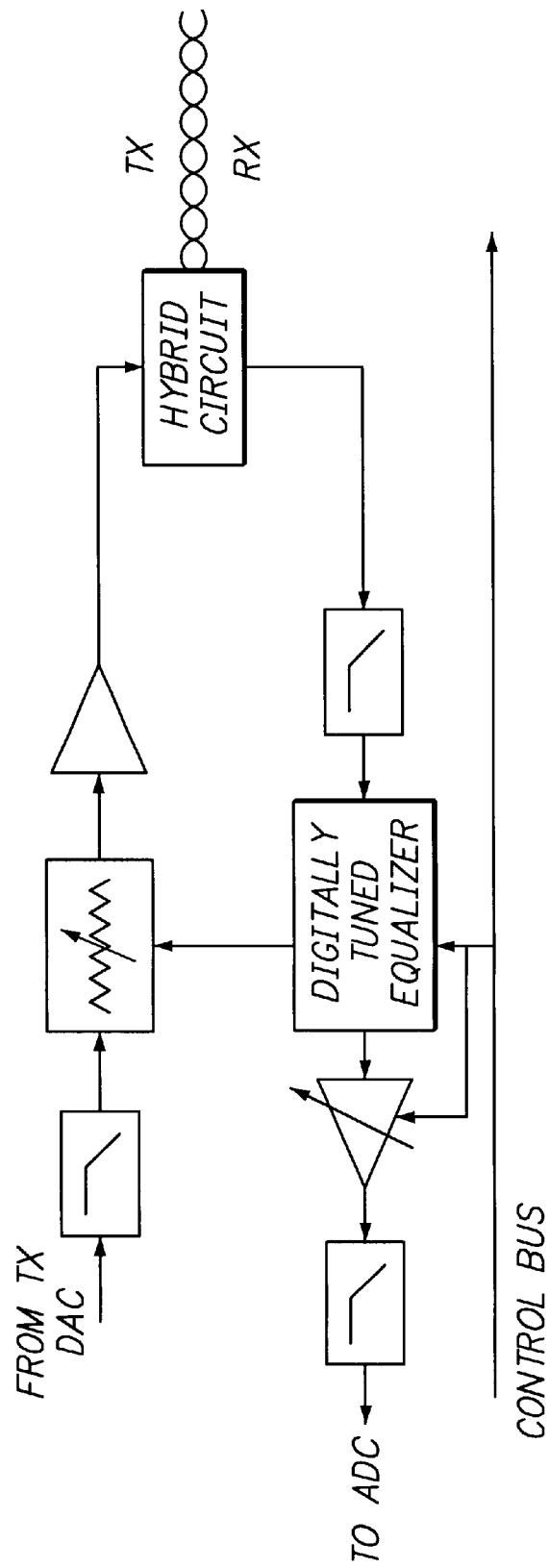
FIG. 3 is a block diagram of a first portion of a communications transceiver in which the present invention may be used.
Figure 4:
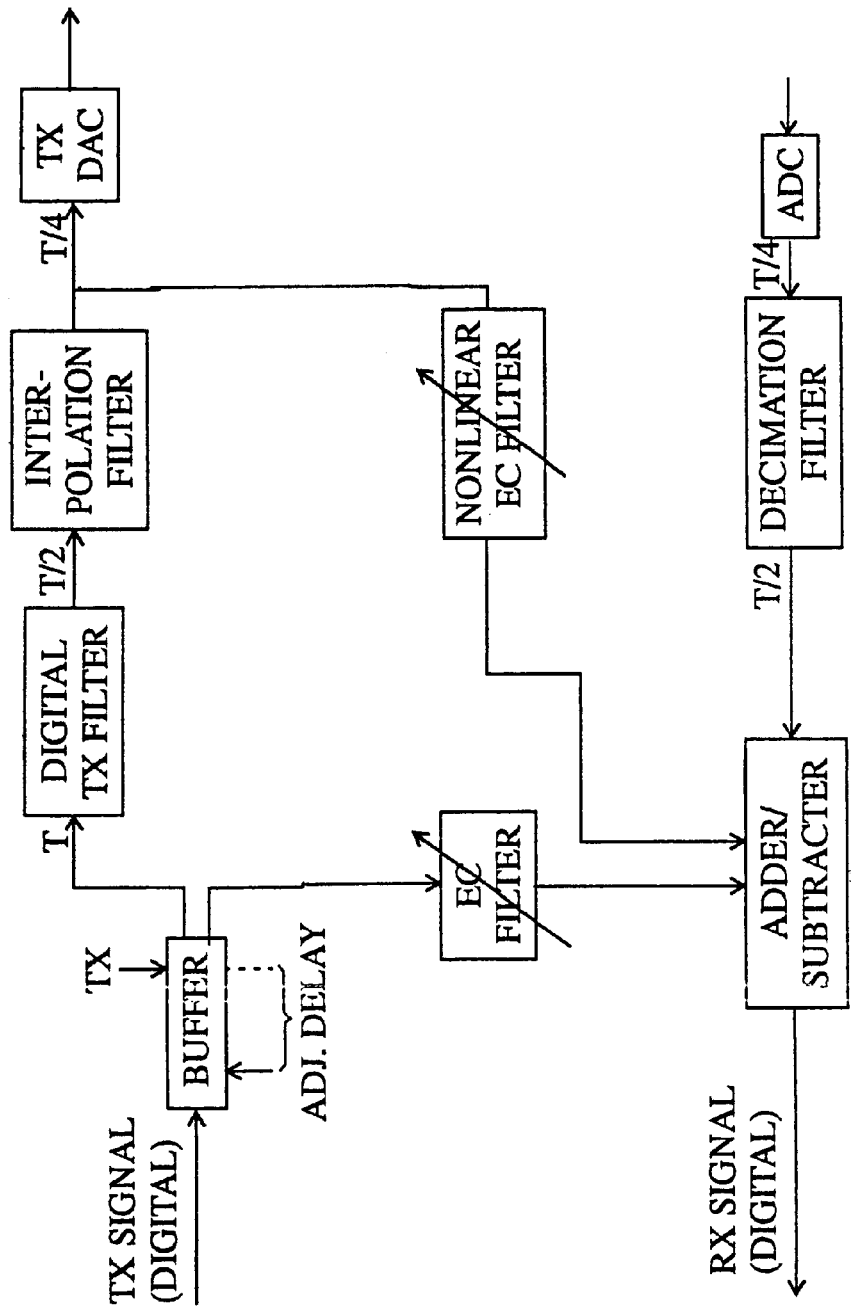
FIG. 4 is a block diagram of a remaining portion of the communications transceiver of FIG. 3.

A simplified communications transceiver is shown in FIG. 3 and FIG. 4, in which the AES path of FIG. 1 and FIG. 2 has been removed. The present non-linear echo canceller may also be used in a simplified communications transceiver of this type, as well as other communications transceivers not shown.

Figure 5:
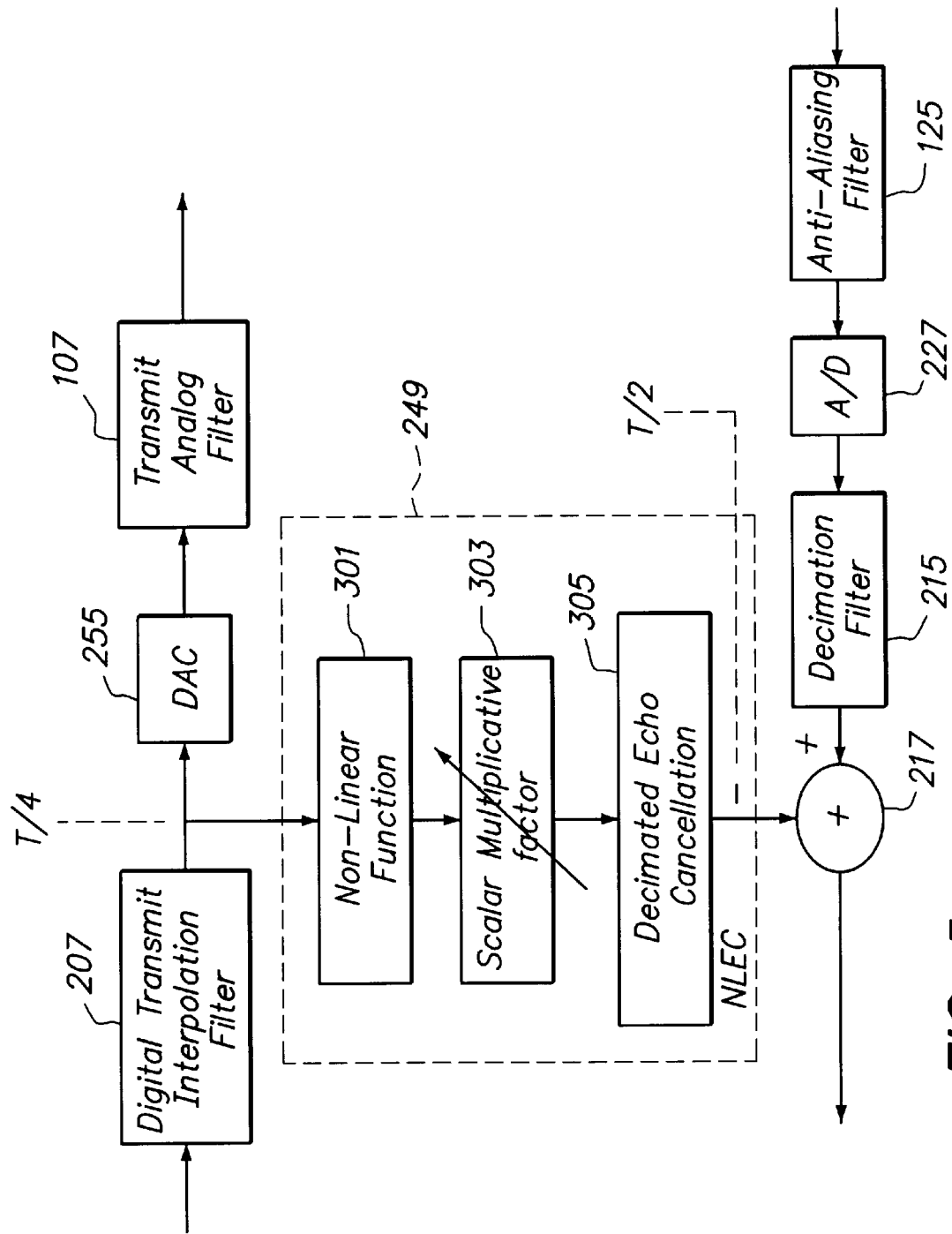
FIG. 5 is a block diagram of a nonlinear echo canceller in accordance with one embodiment of the present invention.

Referring now to FIG. 5, a more detailed block diagram is shown of the non-linear echo canceller 249. Hardware 301 realizes a nonlinear function characteristic of the transmit DAC. The nonlinear function will typically include a square term and/or a cube term, but may include higher powers. Typically, the hardware 301 will include one or more multipliers. In the case of the AFE of FIG. 1 and FIG. 2, which includes in the transmit path the digitally controlled attenuator 103, the nonlinear echo canceller also includes scaler hardware 303 for applying a like adjustable multiplicative scale factor.

An output signal of the scaler 303 is applied to an adaptive echo canceller 305. In the exemplary embodiment, the echo canceller 305 is a decimated echo canceller, since the input to the nonlinear echo canceller and hence to the echo canceller 305 occurs at rate T/4, and the output of the echo canceller 305 occurs at a rate T/2. For purposes of efficiency, the T/4 rate input data may be separated into two T/2 rate input streams, and the echo canceller may be realized in the form of two T/2 echo cancellers the output signals of which are summed to form the T/2 output of the echo canceller 305.

Optionally, a second nonlinear echo canceller 249' may be provided in conjunction with the AES path. Whereas the nonlinear echo canceller 249 feeds off the input to the transmit DAC, the nonlinear echo canceller 249' feeds off the input to the AES DAC.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A communications transceiver having linear and non-linear echo cancellation capabilities and configured to generate a transmit and receive signal, the transceiver comprising:

a transmit filter that filters the transmit signal;

a linear echo cancellation path that receives the transmit signal, the linear echo cancellation path having a linear echo canceller and configured to generate a linear echo cancellation signal;

a non-linear echo cancellation path that receives the filtered transmit signal, the non-linear echo cancellation path having a non-linear echo canceller and configured to generate a non-linear echo cancellation signal; and an adder/subtracter in communication with the receive signal, the linear echo cancellation signal and the non-linear echo cancellation signal, the adder/subtracter configured to subtract the linear echo cancellation signal and the non-linear echo cancellation signal from the receive signal in order to reduce linear and non-linear echoes.

2. The transceiver of claim 1 further comprising an analog echo synthesis (AES) path that receives the transmit signal, the AES path comprising a non-linear echo canceller.

3. The transceiver of claim 2 wherein the non-linear echo canceller is configured to generate a non-linear AES signal that is subtracted from the receive signal with the adder/subtracter.

4. The transceiver of claim 3 wherein the non-linear echo canceller generates the non-linear AES signal that is subtracted from the receive signal prior to conversion with an AES digital-to-analog converter.

5. The transceiver of claim 1 wherein the linear echo canceller and the non-linear echo canceller are adaptive digital filters.

6. The transceiver of claim 1 wherein the transmit filter is a digital transmit filter.

7. The transceiver of claim 1 wherein the transmit filter is a digital transmit filter and an interpolation filter.

8. A method for canceling non-linear and linear echoes from a receive signal, the method comprising the steps of:

generating a transmit signal;

generating a linear echo cancellation signal from the transmit signal with a linear echo canceller;

filtering the transmit signal with a transmit filter;

generating a non-linear echo cancellation signal from the filtered transmit signal using a non-linear echo canceller; and subtracting the linear echo cancellation signal and the non-linear echo cancellation signal from the receive signal with a subtracter in order to remove linear and non-linear echoes.

9. The method of claim 8 further comprising the step of:

generating an analog echo synthesis (AES) signal from the transmit signal with a non-linear echo canceller; and subtracting the AES signal from the receive signal with the subtracter.

10. The method of claim 9 further comprising the steps of generating a non-linear AES signal with the non-linear echo canceller and subtracting the non-linear AES signal from the receive signal.

11. The method of claim 10 wherein the non-linear AES signal subtracted from the receive signal is generated prior to converting the signal with an AES digital-to-analog converter.

12. The method of claim 8 wherein the linear echo canceller and the non-linear echo canceller are adaptive signal filters.

13. The method of claim 8 wherein the step of filtering the transmit signal is performed with a digital transmit filter.

14. The method of claim 8 wherein the step of filtering the transmit signal is performed with a digital transmit filter and an interpolation filter.

* * * * *

UNITED STATES PATENT AND TRADEMARK OFFICE
CERTIFICATE OF CORRECTION

| | | |
|---|---|---|
| PATENT NO. | : 6,813,311 B1 | Page 1 of 1 |
| APPLICATION NO. | : 09/525452 | |
| DATED | : November 2, 2004 | |
| INVENTOR(S) | : Pal et al. | |

It is certified that error appears in the above-identified patent and that said Letters Patent is hereby corrected as shown below:

On the Title Pg. Item (54) and Col. 1, lines 1-2, please delete the word "WIRELESS" and replace with --WIRELINE-- so that the title of the invention reads:

NON-LINEAR ECHO CANCELLATION FOR WIRELINE MODEMS AND THE LIKE

Signed and Sealed this
Eighth Day of March, 2011

David J. Kappos
*Director of the United States Patent and Trademark Office*